United States Patent Office 3,356,742
Patented Dec. 5, 1967

3,356,742
PREPARATION OF FLUOROALCOHOLS BY REACTION OF FLUOROKETONES WITH SELECTED HYDROGEN DONORS
Thomas A. Ford, Hockessin, Del., assignor to E. I. du Pont de Nemours and Company, Wilmington, Del., a corporation of Delaware
No Drawing. Filed Mar. 2, 1965, Ser. No. 436,632
11 Claims. (Cl. 260—617)

ABSTRACT OF THE DISCLOSURE

Preparation of selected fluoroalcohols by reduction of haloketones with aldehydes, alcohols or formates at elevated temperature and optionally in the presence of a basic catalyst, and also the single novel alcohol 1H-hexafluorocyclobutanol useful as a solvent.

This invention relates to, and has as its principal object provision of, a novel process for the synthesis of selected fluorinated alcohols. Provision of a novel fluoroalcohol, 1H-hexafluorocyclobutanol, is another object of the invention.

It is known to prepare secondary fluoroalcohols by reduction of the corresponding fluoroketones either by treatment with complex metal hydrides such as lithium aluminum hydride or sodium borohydride, or by catalytic hydrogenation under pressure in the presence of platinum or copper/chromium oxide catalysts. These prior methods are not free from disadvantages. Thus, the first one involves the use of highly inflammable and expensive reducing agents in organic solvent systems. In the second one, the impurities which are normally present in the fluoroketones tend to poison the catalyst unless the fluoroketone is specially and carefully purified beforehand.

The present invention avoids such disadvantages as are enumerated above by means of a process for preparing fluorinated secondary alcohols in which (1) certain polyhaloketones are reacted with (2) certain hydrogen donors by contacting the same at a temperature of at least 100° C. In the absence of a reaction catalyst, the reaction must be carried out at a temperature of at least 150° C., and preferably at least 200° C.

The formula of the polyhaloketone reactant may be written as $R^1$—CO—$R^2$, where $R^1$ and $R^2$, alike or different, are perfluoroalkyl, ω-hydroperfluoroalkyl, ω-chloroperfluoroalkyl or ω-dichloroperfluoroalkyl of up to 8 carbons. $R^1$ and $R^2$ can also constitute a single divalent radical of the formula —$CF_2CF_2C(X^1X^2)$— where $X^1$ and $X^2$, alike or different, are fluorine or chlorine. The resulting alcohols have the formula

Suitable hydrogen donors are those of the formulae $R^3CHO$, $R^3CHOHR^4$, and $HCOOR^3$, where $R^3$ and $R^4$, alike or different, are hydrogen or alkyl of up to 6 carbons. Specific usable hydrogen donors include: lower aliphatic aldehydes, e.g., formaldehyde, acetaldehyde, propionaldehyde, butyraldehyde, valeraldehyde, n-hexanal, etc.; lower primary and secondary alkanols, e.g., methanol, ethanol, 1-propanol, 2-propanol, isobutyl alcohol, sec.-butyl alcohol, 1-pentanol, 2-pentanol, 1-hexanol, 3-hexanol, etc.; formic acid, HCOOH; and lower alkyl esters of formic acid, e.g., methyl, ethyl, propyl, butyl or n-hexyl formate, etc.

Suitable catalysts are bases of the group consisting of alkali or alkaline earth metal hydroxides, alkali metal salts of acids with a dissociation constant lower than $2 \times 10^{-4}$, and tertiary amines. Specific usable catalysts include: alkali metal hydroxides, e.g., LiOH, NaOH, KOH, RbOH, and CsOH; alkaline earth metal hydroxides, e.g., $Be(OH)_2$, $Mg(OH)_2$, $Ca(OH)_2$, $Sr(OH)_2$, and $Ba(OH)_2$; alkali metal salts of formic acid or weaker acids, e.g., the formates, acetates, propionates, lactates, phenolates, carbonates, bicarbonates, borates, and silicates of Li, Na, K, Rb, and Cs; and tertiary amines, e.g., pyridine, N-methylpiperidine, trimethylamine, triethylamine, tributylamine, tri(cyclohexyl)amine, N,N-dimethylaniline, etc.

Reaction in the absence of a catalyst requires a temperature above 150° C. and preferably in the range 200–300° C. in order to obtain a useful extent of reaction in a reasonable time. At 250–300° C., nearly quantitative conversions are obtained in 16 hours or less. There is no advantage in exceeding a temperature of about 400° C. With a catalyst of the type mentioned above, the reaction occurs slowly at 50° C., but is preferably run at above 100° C., and especially conveniently at 150–300° C. where reaction is rapid and substantially complete in 16 hours or less.

It is desired that the reaction mixture be confined in a pressure vessel, where the pressure is conveniently 50 to 1000 atm., as determined by the autogenous pressure of the reactants, but may be lower than 50 atmospheres (with correspondingly lower diminished space-time yield) or higher than 1000 atmospheres (by application of compression).

Diluents may be added, especially if needed to solubilize the catalyst, but are generally unnecessary. The organic hydrogen donor generally serves as a reaction medium in which the catalyst has adequate solubility. The quantity of catalyst required is small. It can be as low as 1 mole percent and seldom needs to be more than 10 mole percent based on the fluoroketone to be reduced. The relative proportions of the hydrogen donor and fluoroketone are not critical since the reaction will proceed regardless of what they are. Generally, the hydrogen donor is used in a molar ratio with respect to the fluoroketone of at least 0.3:1 and preferably at least 0.75:1. A slight to moderate molar excess of the hydrogen donor, e.g., 1.02:1 to 1.2:1, generally gives best results in that it is usually the less expensive reactant, and also because an excess of unreacted hydrogen donor is easier to separate from the product fluoroalcohol than is unreacted fluoroketone remaining when the fluoroketone is used in excess. There is generally no advantage in exceeding a molar ratio of 1.5:1.

The reaction product can be isolated by conventional fractionation procedures. In some cases, however, some or most of the secondary fluoroalcohol is obtained as a constant boiling mixture containing minor amounts of the hydrogen donor and/or by-products of the reaction. If desired, these azeotropes can be subjected to a separating operation, for example a chromatographic treatment, to obtain the fluoroalcohol in a pure state. Such an operation is, however, generally unnecessary for most of the uses to which the fluoroalcohols are put. Formic acid shows no tendency to form such azetotropes, and it is therefore the preferred hydrogen donor, as its use affords clean-cut reactions and excellent yields.

EMBODIMENTS OF THE INVENTION

There follow some nonlimiting examples illustrative of the invention in more detail. In these examples, pressures are autogenous unless otherwise indicated. In Examples 1 and 2, the carbon monoxide introduced into the reaction mixture was intended to induce a reaction different from that observed. The expected reaction did

Example 1

A 240 ml.-capacity pressure vessel lined with "Hastelloy" C (a commercial nickel-iron-molybdenum alloy) was charged with 9.2 g. (0.2 mole) of formic acid. It was then closed, cooled, and partially evacuated, and 83 g. (0.5 mole) of hexafluoroacetone was added. The vessel was installed in a barricaded shaker machine, pressured while cold with carbon monoxide to 200 atm., and heated with shaking. The temperature was held at 120° C. (developed pressure, 400 atm.) for 2 hours, then at 150° C. (430 atm.) for 1 hour, then at 200° C. (490 atm.) for 4 hours. There was no significant pressure drop at any of these temperatures, indicating that the carbon monoxide was not involved in the reaction. The reaction vessel was then cooled, the gases were vented off, and the remaining liquid product was distilled. The low-boiling (53–99° C.) fraction comprising about 25% of the liquid product showed strong infrared absorption bands characteristic of 2H-hexafluoro-2-propanol.

Example 2

A 240-ml. "Hastelloy" C-lined pressure vessel was charged with 6.4 g. (0.2 mole) of methanol and 83 g. (0.5 mole) of hexafluoroacetone, and heated under pressure of carbon monoxide at 250° C. (940–990 atm.) for 8 hours. It was then cooled to 0° C., the gases were vented off, and the liquid product, 69 g., was discharged and fractionally distilled at atmospheric pressure.

There was obtained (a) a 17.9 g. fraction, B.P. 57–58° C., which was essentially pure 2H-hexafluoro-2-propanol as shown by its boiling point, refractive index ($n_D^{24.5}$ 1.2775). NMR spectrum, and infrared spectrum; (b) an intermediate fraction of 5.9 g., B.P. 58–72° C., $n_D^{24.5}$ 1.2848; (c) an 11.3 g. fraction, B.P. 72–73° C., $n_D^{24.5}$ 1.2892; (d) 3.0 g., B.P. 71–85° C., $n_D^{24.5}$ 1.2910; and (e) 1.1 g. higher boiling. An additional 2.8 g. of product, $n_D^{24.5}$ 1.2730, was recovered from a cold trap connected to the still during distillation, by allowing the trap to warm slowly to room temperature while the low-boiling material (excess hexafluoroacetone) boiled off.

In this preparation, some methyl formate was obtained as a coproduct. The fraction (c) with B.P. 72–73° C. was found by NMR and infrared spectra to be a mixture (azeotropic) of 2H-hexafluoro-2-propanol with methyl formate, having a $(CF_3)_2CHOH/HCOOCH_3$ mole ratio of 2/1, or weight ratio of 85/15. The total weight of 2H-hexafluoro-2-propanol recovered in the various fractions was estimated to be about 34 g., or 0.2 mole, from 0.2 mole of methanol.

Methyl formate and 2H-hexafluoro-2-propanol were also formed when hexafluoroacetone was heated with methanol and sodium methoxide to 250° C. under autogenous pressure.

Example 3

A 400-ml. silver-lined pressure vessel was charged with 27.6 g. (0.6 mole) of formic acid and 5.1 g. (0.075 mole) of sodium formate. The vessel was closed, cooled and partially evacuated, and 125 g. (0.75 mole) of hexafluoroacetone was added. The valve was closed, and the vessel was shaken and heated. The reaction mixture was maintained at 250° C. for 16 hours at autogenous pressure. The vessel was cooled to 0° C., gases were vented, and the liquid product was discharged. It was filtered to remove a white solid, 3.3 g., and the clear liquid was then distilled.

The main fraction, 78.6 g., B.P. 57–58° C., $n_D^{24.5}$ 1.2775, was 2H-hexafluoro-2-propanol, with a small amount of an impurity indicated by a minor absorption peak at 10.3μ in the infrared spectrum which was otherwise that of pure 2H-hexafluoro-2-propanol.

Examples 4–11

Examples 4–11, set forth in Table I, below, show reactions carried out in the same manner as in Example 3, with the variations indicated in the table. Example 4 shows the use of pyridine in place of sodium formate as catalyst. Examples 5 to 9 show that the optimum results with a basic catalyst are obtained at temperatures above 100° C., while Examples 10 and 11 show that without a basic catalyst the yields are lower at equivalent temperatures, and that a temperature of about 200° C. or higher is necessary to obtain practical results.

The experiments employing formic acid in molar excess over the hexafluoroacetone gave, upon simple fractional distillation, pure 2H-hexafluoro-2-propanol, as shown by the infrared spectra and refractive indices, without any of the minor impurity noted in Example 3 and other experiments in which hexafluoroacetone was used in excess. This high purity was confirmed by gas chromatography in the case of Example 5, in which the foreshot, B.P. 56–57° C., $n_D^{24.5}$ 1.2780, 25 g., and the two main fractions, B.P. 57–58° C., $n_D^{24.5}$ 1.2780–1.2782, 234 g., were analyzed, and all were indicated to be >99% pure.

TABLE I

| Example | Vessel | HCOOH, Moles | HFA,[3] Moles | Catalyst, Moles | Temp., ° C. | Weight HFIP, g.[4] | Yield HFIP, Percent |
|---|---|---|---|---|---|---|---|
| 4 | A [1] | .8 | .75 | .075, pyridine | 250 | 102 | 81 (on HFA). |
| 5 | B [2] | 2.0 | 1.9 | 0.1, HCOONa | 250 | 264 | 83 (on HFA). |
| 6 | B | 2.0 | 1.9 | 0.1, HCOONa | 200 | 273 | 85 (on HFA). |
| 7 | B | 2.0 | 1.9 | 0.1, HCOONa | 150 | 282 | 88 (on HFA). |
| 8 | B | 2.0 | 1.9 | 0.1, HCOONa | 100 | 186 | 58 (on HFA). |
| 9 | A | .6 | .75 | .075, HCOONa | 50 | ~4 | ~4 (on HCOOH). |
| 10 | A | .6 | .75 |  | 250 | 65.7 | 65 (on HCOOH). |
| 11 | A | .6 | .75 |  | 150 | Trace | <1. |

[1] Vessel A was of 400 ml. capacity, silver lined.
[2] Vessel B was of 1,200 ml. capacity, "Hastelloy" C lined.
[3] HFA is hexafluoroacetone.
[4] HFIP is 2H-hexafluoro-2-propanol.

Example 12

A 400-ml. silver-lined pressure vessel was charged with 48 g. (0.8 mole) of methyl formate, 5.1 g. (0.075 mole) of sodium formate, and 125 g. (0.75 mole) of hexafluoroacetone. The mixture was agitated and heated for 16 hours at 250° C. After the vessel was cooled and vented, the liquid product was discharged, filtered, and distilled at atmospheric pressure. The major product, B.P. 67–72° C., $n_D^{24.5}$ 1.2922, amounted to 49 g., and was shown by its infrared spectrum to be a mixture of the azeotrope of methyl formate and 2H-hexa-fluoro-2-propanol with minor amounts of impurities.

Example 13

A 400-ml. silver-lined pressure vessel was charged with 48 g. of 37% formaldehyde solution containing approximately 17.8 g. (0.6 mole) of CH₂O, 6.0 g. (0.2 mole) of CH₃OH, and 24.2 g. (1.3 mole) of water. The vessel was closed, cooled, and partially evacuated, and 125 g. (0.75 mole) of hexafluoroacetone was added. The mixture was agitated and heated at 250° C. under autogenous pressure for 16 hours. It was then cooled and vented, and the liquid product was discharged and distilled at atmospheric pressure.

A 17-g. fraction, B.P. 58° C., $n_D^{24.5}$ 1.2770, having the infrared spectrum of pure 2H-hexafluoro-2-propanol was the first product distilled over. Subsequent fractions included: 19 g. of a mixture with a constant boiling point of 67.5° C., mostly 2H-hexafluoro-2-propanol and methyl formate (mole ratio 9:1 by NMR), the latter being formed because of a side reaction; 54.5 g. of another mixture with a constant boiling point of 80° C., mostly 2H-hexafluoro-2-propanol with small percentages of methanol and water; and 38.6 g. of additional fractions having intermediate boiling point ranges.

Example 14

A 400-ml. silver-lined pressure vessel was charged with 48 g. (0.8 mole) of isopropyl alcohol and 125 g. (0.75 mole) of hexafluoroacetone, and the mixture was agitated and heated for 16 hours under autogenous pressure at 250° C. The vessel was cooled to 0° C., vented, and the liquid product was discharged and distilled. Fractions having boiling points of 84° C. (11.9 g.) and 91.5–93° C. (120.7 g.) were obtained, along with some foreshot and 8 g. of an intermediate fraction. NMR and infrared spectra indicated the first of these azeotropes to be 2H-hexafluoro-2-propanol (ca. 77% by weight) with acetone, water, and isopropyl alcohol, and the second to be 2H-hexafluoro-2-propanol (ca. 75% by weight) with acetone and isopropyl alcohol. The indicated conversion of hexafluoroacetone to 2H-hexafluoro-2-propanol was about 85%.

Example 15

A 400-ml. silver-lined pressure vessel was charged with 36.8 g. (0.8 mole) of formic acid, 5.1 g. (0.075 mole) of sodium formate, and 149.2 g. (0.75 mole) of 1,3-dichloro-1,1,3,3-tetrafluoroacetone. It was then closed and the mixture was agitated and heated under autogenous pressure at 250° C. for 16 hours. The vessel was then cooled to 0° C., vented, and the liquid product was discharged, filtered to remove a small amount of solid (2.2 g.) and distilled. After 15 g. of foreshot, $n_D^{24}$ 1.3686, there was recovered 101 g. of 1,3-dichloro-1,1,3,3-tetrafluoro-2-propanol, B.P. 108–110° C., $n_D^{24}$ 1.3706–1.3710, corresponding to a conversion of 68% of the starting ketone to the corresponding secondary alcohol.

Example 16

An 80-ml. "Hastelloy"-lined pressure vessel was charged with 5.1 g. (0.111 mole) of formic acid, 0.75 g. (0.011 mole) of sodium formate and 21.5 g. (0.12 mole) of hexafluorocyclobutanone, and the mixture was agitated and heated for 15 hours at 250° C. under autogenous pressure. The vessel was then cooled to 0° C., the gases were vented off, and the liquid product was discharged. Distillation in the presence of a small amount of added sodium fluoride yielded 9.5 g. of fractions boiling at 66–69° C. and 2.2 g. of higher-boiling liquid. A representative fraction boiling at 69° C. was shown by elemental and spectral analyses to be 1H-hexafluorocyclobutanol,

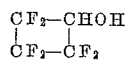

*Analysis.*—Calc'd. for $C_4H_2F_6O$: C, 26.68; H, 1.12; F, 63.31. Found: C, 27.23; H, 1.31; F, 62.94.

The infrared spectrum showed absorption peaks at 2.98μ (OH), 3.37μ (saturated C—H), and strong absorptions in the 7.5–10μ region for C—F and/or C—O. The nuclear magnetic resonance spectrum also confirmed the structure.

1H-hexafluorocyclobutanol is a new compound. It has good solvent power for various polymeric materials, as exemplified by the fact that it readily dissolves commercial polymethyl methacrylate and polyhexamethyleneadipamide.

The process of this invention is applicable to any polyfluoroketone having the general formula previously set forth. Other specific examples of operable fluoroketones

TABLE II

| Ketone | Product |
|---|---|
| Perfluorobutanone<br>$CF_3CF_2COCF_3$ | 2H-perfluoro-2-butanol<br>$CF_3CF_2CHOHCF_3$ |
| Perfluoro-2-pentanone<br>$CF_3CO(CF_2)_2CF_3$ | 2H-Perfluoro-2-pentanol<br>$CF_3CHOH(CF_2)_2CF_3$ |
| Perfluoro-3-pentanone<br>$CF_3CF_2COCF_2CF_3$ | 3H-perfluoro-3-pentanol<br>$CF_3CF_2CHOHCF_2CF_3$ |
| Perfluoro-3-hexanone<br>$CF_3CF_2CO(CF_2)_2CF_3$ | 3H-perfluoro-3-hexanol<br>$CF_3CF_2CHOH(CF_2)_2CF_3$ |
| Perfluoro-4-heptanone<br>$CF_3(CF_2)_2CO(CF_2)_2CF_3$ | 4H-perfluoro-4-heptanol<br>$CF_3(CF_2)_2CHOH(CF_2)_2CF_3$ |
| Perfluoro-(2,4-dimethyl-3-pentanone)<br>$(CF_3)_2CFCOCF(CF_3)_2$ | 3H-perfluoro-(2,4-dimethyl-3-pentanol)<br>$(CF_3)_2CFCHOHCF(CF_3)_2$ |
| Perfluoro-(2,6-dimethyl-4-heptanone)<br>$(CF_3)_2CFCF_2COCF_2CF(CF_3)_2$ | 4H-perfluoro-(2,6-dimethyl-4-heptanol)<br>$(CF_3)_2CFCF_2CHOHCF_2CF(CF_3)_2$ |
| Perfluoro-7-tridecanone<br>$CF_3(CF_2)_5CO(CF_2)_5CF_3$ | 7H-perfluoro-7-tridecanol<br>$CF_3(CF_2)_5CHOH(CF_2)_5CF_3$ |
| 1,1,3-trichloro-1,3,3-trifluoropropanone<br>$CFCl_2COCF_2Cl$ | 1,1,3-trichloro-1,3,3-trifluoro-2-propanol<br>$CFCl_2CHOHCF_2Cl$ |
| 1,1,3,3-tetrachloro-1,3-difluoropropanone<br>$CFCl_2COCFCl_2$ | 1,1,3,3-tetrachloro-1,3-difluoro-2-propanol<br>$CFCl_2CHOHCFCl_2$ |
| 1,5-dichlorooctafluoro-3-pentanone<br>$Cl(CF_2)_2CO(CF_2)_2Cl$ | 1,5-dichlorooctafluoro-3-pentanol<br>$Cl(CF_2)_2CHOH(CF_2)_2Cl$ |
| 1-chloro-4-trifluoromethyloctafluoro-3-pentanone<br>$Cl(CF_2)_2COCF(CF_3)_2$ | 1-chloro-4-trifluoromethyloctafluoro-3-pentanol<br>$Cl(CF_2)_2CHOHCF(CF_3)_2$ |
| 1,1,3,3-tetrafluoropropanone<br>$HCF_2COCF_2H$ | 1,1,3,3-tetrafluoro-2-propanol<br>$HCF_2CHOHCF_2H$ |
| 1H,5H-octafluoro-3-pentanone<br>$H(CF_2)_2CO(CF_2)_2H$ | 1H,3H,5H-octafluoro-3-pentanol<br>$H(CF_2)_2CHOH(CF_2)_2H$ |

TABLE II—Continued

| Ketone | Product |
|---|---|
| 1H,5H-hexafluoro-2-4-trifluoromethyl-3-pentanone<br>HCF$_2$CFCOCFCF$_2$H<br>\|  \|<br>CF$_3$  CF$_3$ | 1H,3H,5H-hexafluoro-2,4-trifluoromethyl-3-pentanol<br>HCF$_2$CFCHOHCFCF$_2$H<br>\|  \|<br>CF$_3$  CF$_3$ |
| 1H,7H-dodecafluoro-3-heptanone<br>H(CF$_2$)$_2$CO(CF$_2$)$_4$H | 1H,3H,7H-dodecafluoro-3-heptanol<br>H(CF$_2$)$_2$CHOH(CF$_2$)$_4$H |
| 1H,9H-hexadecafluoro-5-nonanone<br>H(CF$_2$)$_4$CO(CF$_2$)$_4$H | 1H,5H,9H-hexadecafluoro-5-nonanol<br>H(CF$_2$)$_4$CHOH(CF$_2$)$_4$H |
| 1H,17H-dotriacontafluoro-9-heptadecanone<br>H(CF$_2$)$_8$CO(CF$_2$)$_8$H | 1H,9H,17H-dotriacontafluoro-9-heptadecanol<br>H(CF$_2$)$_8$CHOH(CF$_2$)$_8$H |
| 2-chloro-2,3,3,4,4-pentafluorocyclobutanone<br>CF$_2$—CO<br>\|    \|<br>CF$_2$—CFCl | 2-chloro-2,3,3,4,4-pentafluorocyclobutanol<br>CF$_2$—CHOH<br>\|    \|<br>CF$_2$—CFCl |
| 2,2-dichloro-3,3,4,4-tetrafluorocyclobutanone<br>CF$_2$—CO<br>\|    \|<br>CF$_2$—CCl$_2$ | 2,2-dichloro-3,3,4,4-tetrafluorocyclobutanol<br>CF$_2$—CHOH<br>\|    \|<br>CF$_2$—CCl$_2$ | are listed in Table II, together with the fluoroalcohols resulting from reaction with any of the hydrogen donors enumerated above.

The fluoroalcohols obtained in this process are widely useful as solvents, plasticizers, dispersing media, and reaction media. It is disclosed in U.S. Patent 3,129,053, for example, that secondary fluoroalcohols of the type obtainable by the present process, e.g., 2H-hexafluoro-2-propanol, 1,3-dichloro-1,1,3,3-tetrafluoro-2-propanol, and many others, are excellent dispersants for normally insoluble or very poorly soluble organic pigments. Furthermore, by virtue of their low surface tension and extraordinary solvent ability, associated with their high hydrogen-bonding power, they are able to penetrate deeply into practically all substrates, even those of low porosity. Still furthermore, fluoroalcohols of this type have unusual solvent power for high molecular weight, synthetic, linear condensation polymers, for example, formaldehyde polymers, nylons, polyimides, polycarbamides, polycarbonates, polycarbamates, and hydrolyzed polyvinyl esters. With such polymers, for which very few low-temperature solvents are known, secondary fluoroalcohols of the type described form homogeneous, stable solutions even at room temperature. There solutions can be used to form shaped articles such as films or filaments from the polymers, or in other applications such as adhesive compositions.

Since obvious modifications and equivalents in the invention will be evident to those skilled in the chemical arts, I propose to be bound solely by the appended claims.

The embodiments of the invention in which an exclusive property or privilege is claimed are defined as follows:

1. The process of producing a secondary fluoroalcohol which comprises reacting, at a temperature between 100 and 400° C. and at at least autogenous pressure, a polyfluoroketone of the formula

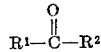

wherein R$^1$ and R$^2$ are selected from the group consisting of perfluoroalkyl, ω-hydroperfluoroalkyl, ω-chloroperfluoroalkyl and ω-dichloroperfluoroalkyl of up to 8 carbons and —CF$_2$CF$_2$C(X$^1$X$^2$)—, X$^1$ and X$^2$ being selected from the group consisting of fluorine and chlorine, with a hydrogen donor selected from the group consisting of R$^3$CHO, R$^3$CHOHR$^4$ and HCOOR$^3$, R$^3$ and R$^4$ being selected from the group consisting of hydrogen and alkyl of up to 6 carbons.

2. The process of claim 1 employing a basic catalyst selected from the group consisting of alkali and alkaline earth metal hydroxides, alkali metal salts of acids having dissociation constants lower than 2×10$^{-4}$, and triethyl-, trimethyl-, tributyl- and tri(cyclohexyl)amine, pyridine, N-methylpiperidine and N,N-dimethylaniline, 3. The process of claim 1 employing a slight to moderate excess of the hydrogen donor over the polyfluoroketone.

4. The process of claim 1 wherein the polyfluoroketone is hexafluoroacetone.

5. The process of claim 1 wherein the polyfluoroketone is 1,3-dichloro-1,1,3,3-tetrafluoroacetone.

6. The process of claim 1 wherein the polyfluoroketone is hexafluorocyclobutanone.

7. The process of producing 2H-hexafluoro-2-propanol according to claim 1 which comprises reacting hexafluoroacetone with formic acid.

8. The process of producing 2H-hexafluoro-2-propanol according to claim 1 which comprises reacting hexafluoroacetone with methanol.

9. The process of producing 2H-hexafluoro-2-propanol according to claim 1 which comprises reacting hexafluoroacetone with formaldehyde.

10. The process of producing 2H-hexafluoro-2-propanol according to claim 1 which comprises reacting hexafluoroacetone with isopropyl alcohol.

11. 1H-hexafluorocyclobutanol.

References Cited

UNITED STATES PATENTS 3,030,409  4/1962  Andreades et al.
3,121,121  2/1964  Lindsey et al.
3,129,053  4/1964  Castle.

OTHER REFERENCES

Andreades et al.: Jour. Amer. Chem. Soc., vol. 83, pp. 4670–1, (1961).

LEON ZITVAR, Primary Examiner.

H. T. MARS, Assistant Examiner.